Sheet 2. 2 Sheets.
R. F. Cooke.
Cotton Picker.
Nº 101,231.                    Patented Mar. 29, 1870.
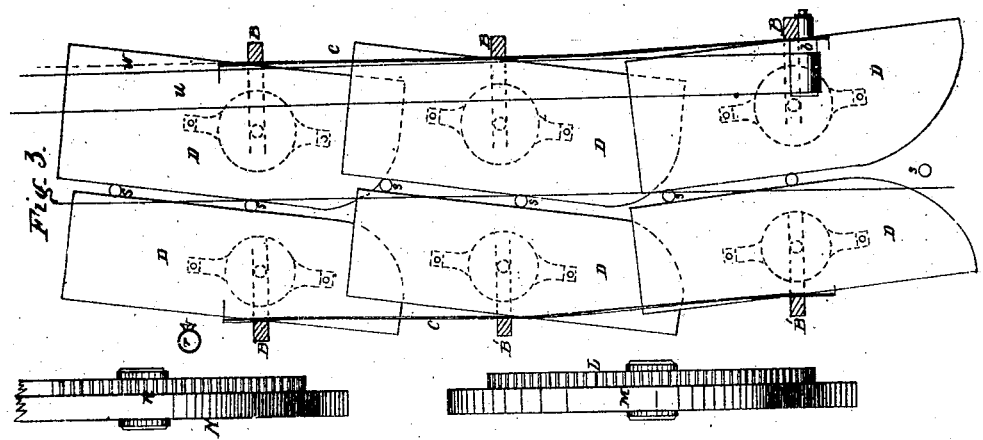
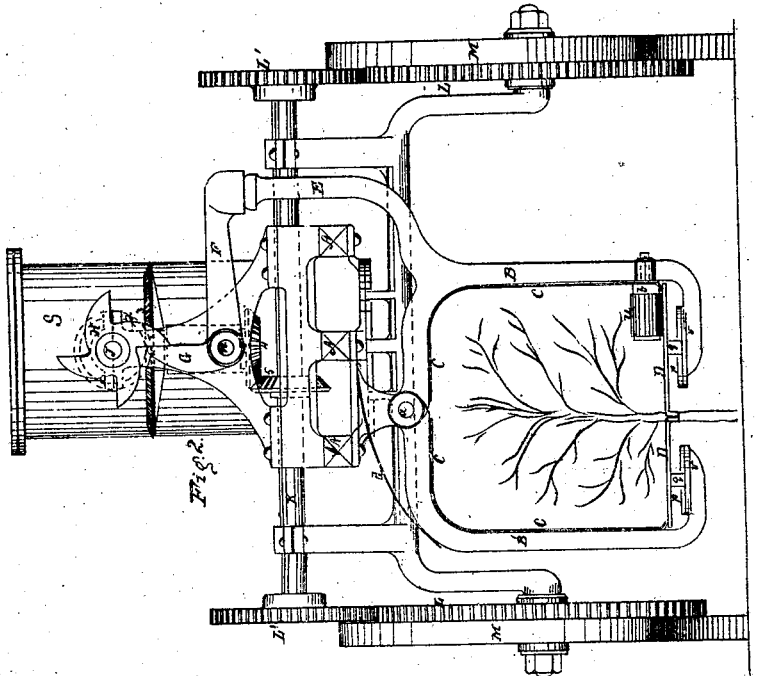
Witnesses                                   Inventor
                                            Robert F. Cooke

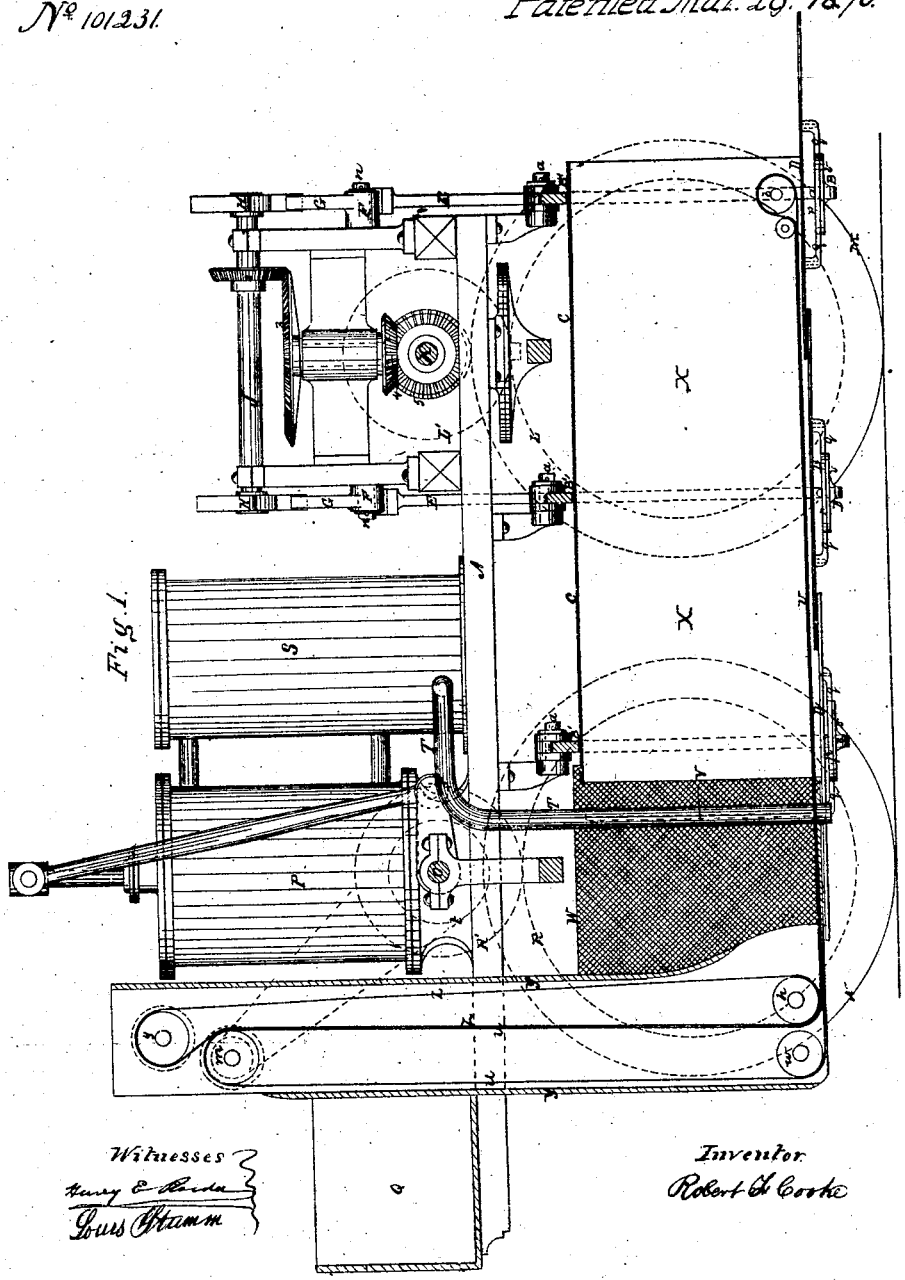

United States Patent Office.

ROBERT F. COOKE, OF BROOKLYN, NEW YORK.

Letters Patent No. 101,231, dated March 29, 1870.

IMPROVEMENT IN COTTON-PICKERS.

The Schedule referred to in these Letters Patent and making part of the same.

*To all whom it may concern:*

Be it known that I, ROBERT F. COOKE, of Brooklyn, Kings county, State of New York, have invented a new and improved Machine for Picking Cotton; and I do hereby declare that the following is a full and exact description of the same, reference being had to the accompanying drawings forming part of this specification, and to the letters of reference marked thereon.

Figure I represents a longitudinal section of my machine for picking cotton;

Figure II is a front elevation; and

Figure III, a section of the tunnel and plan of the bottom platform-plates.

Similar letters represent similar parts in all the figures.

This invention is an improvement on the machine for picking cotton for which Letters Patent were granted to me on the 26th day of May, 1868, and consists in the arrangement of a number of bent arms or levers hinged to the frame of the wagon, extending downward, and supporting at their lower ends movable plates forming a platform. The inside of these levers or arms are connected together by a suitable flexible material extending from one arm to the other arm, forming thus, together with the bottom plates, a tube or tunnel through which the cotton-tree or plant is made to pass.

The invention consists further in the arrangement of a knocking or hammering device applied to one or more of the arms supporting the above-mentioned tube or tunnel, whereby a succession of blows or a shaking is communicated through said tunnel to the cotton-tree or plant while passing through the tunnel.

And further, my invention consists in a peculiar manner of attaching the plates forming the bottom platform to the lower ends of the levers, whereby the same can easily accommodate themselves to any irregularity existing in the position of the cotton-trees in the field.

In the accompanying drawings—

A represents the frame of the carriage or wagon attached to the axles of the wheels to which the different parts of the machinery are fastened. This frame is built sufficiently high to allow the cotton-tree or plant to pass freely under the same, as well as under the axles of its wheels.

To the lower side of this frame A arms or levers B B' are hinged.

These levers are bent outward and extend then downward to allow the cotton-trees or plants to pass between them, turning freely on their center $a$, and are placed about opposite each other.

The lower ends of these levers B B' are again bent inward toward the middle, and have plates D D attached, meeting near the center, and extending forward and backward of their arms for some distance, so that the forward plates overlap those placed behind the same, and thus form a continuous platform of some length.

To the inner sides of the levers B B', at the sides and top part, a flexible material, C, of close texture, such as canvas, India rubber, or their equivalent, is attached, extending from one arm to the other arm, and forming in connection with the plates D D a close box, tube, or tunnel, X, through which the cotton-trees or plants can pass.

To the levers B arms E are attached, extending upward some distance above the frame A and against the levers B', suitable springs $d$ fastened to the frame A and made to act.

Above the frame A a hammer or weighted lever, F, is arranged, turning freely on its center $n$, and resting on the top of the arm E attached to or forming a part of the lever B.

This lever F has an upward-projecting arm or nose, G, which is acted upon by points or projections H attached to a revolving shaft, J.

This shaft J receives motion through the gearing 2, 3, 4, 5, from a shaft, K, which is provided with pinions L' L' (see fig. II,) on its ends, working into the teeth-wheels L L attached to the front wheels M of the wagon.

Instead of providing only the lever or levers B with an arm, E, and operating the same through the weighted lever or hammer F, in the manner and for the purpose above described, the lever B', as well as every arm supporting the tunnel X, may be arranged and operated in a like manner.

Above the axle of the after wheels N, upon the frame A, an air or blowing-cylinder, P, is arranged, operated from a shaft, O, which receives its motion from the teeth-wheels R attached to the after wheels N, in connection with suitable pinions R' attached to the ends of said shaft O.

This cylinder discharges the air into a receiver, S, from which a pipe, T, leads downward on one side and behind the end of the tube or tunnel X formed by the flexible material and bottom plates, as above described.

This pipe T is closed at the bottom and provided with a long slot or opening, V, on its inner side toward the center of the machine, and extends nearly the whole height of the tunnel X, through which the air is discharged and blown across the end of said tunnel.

Instead of one pipe, as here represented, two or more pipes may be arranged, some little distance one behind the other, and suitable cocks or valves may be arranged in the pipe or pipes to regulate or close the escape of air.

Opposite to this pipe T on the other side of the tube or tunnel X a perforated plate or wire-cloth, W, is arranged, extending from the end of the tunnel X to the elevator-box Y.

At the bottom of the tunnel X on the side where the perforated plate or wire-cloth W is arranged, and close to the top surfaces of the plates D, an endless band, U, is arranged, passing over a roller, *b*, placed near the beginning of the tunnel X, to a roller, *h*, in the bottom of the elevator-box Y, upward over a roller, *m*, near the top of said box Y, and then down again over a roller, *w*, near the bottom of said box, and back again to the roller *b*.

From the roller *h* to the roller *m* this band U runs side by side with a band, Z, passing over rollers *h* and *y*, and between which said two bands the cotton is carried upward and falls then into the receiving-box Q placed near the end of the machine.

Motion is communicated to these bands U and Z by means of suitable belts or gearing connected with a wheel, *t*, attached to the shaft O.

Near the roller *m*, where the cotton is discharged, suitable rollers or brushes may be arranged to separate the leaves of the plant from the cotton.

Instead of placing the roller *b* near the front of the tunnel X above the plates D, as above described, the same may be arranged further back and below the bottom plates D, and the band U passed upward above the plates through a suitable opening in one of the plates D.

The lower ends of the levers or arms B and B', which are turned some distance inward, are arranged with a circular horizontal plate, *v*, provided with an upright pin upon which a corresponding plate, *p*, is placed, provided with arms *g* to which the plates D are securely fastened.

By this arrangement these bottom plates D are capable of turning horizontally around the upright pins in the plates *v*, so as to accommodate themselves to any irregularity which may exist in the position of the cotton-trees or plants.

The forward inner ends of these plates D are rounded off or made bell-mouthed, to allow the cotton plants to enter and pass easily between these plates, (see fig. III.)

In the same manner may the after ends of said plates be rounded to allow the plants to enter freely between the plates, in case the machine should be moved backward.

The levers B and B' being hinged and turning on their central bolt *a* will allow the plates D to move sideways or to separate, to allow the stem of the cotton-tree or plant to force themselves and pass between the same, and, the above-described manner of fastening the said plates to these levers B B' will allow a horizontal turning to said plates, so as to offer no obstruction to any irregularity in the position of the trees, as is fully represented and shown in fig. III, where *s* represents a number of cotton-trees planted very irregular in a row.

The weighted lever or hammer F upon the arm E, and the spring *d* acting against the lever B', will cause the plates D to lay always close against the stem of the cotton-plants or trees.

The operation of the machine is as follows:

By means of suitable guides attached to any convenient part of the carriage, or to the arms B B', (not shown in the drawings, but fully described in my former above-mentioned patent,) the lower branches of the cotton-plant are bent or moved upward and the plant guided into the tube or tunnel X between the inner edges of the plates D D.

The forward motion of the machine revolves the shaft J, causing the points or projections H to act upon the arm or nose G of the lever F in such a manner as to produce a succession of blows upon the top end of the arm E, which are communicated, through the lever B and plate D resting against the stem of the cotton-plant, to said cotton-plant, producing thereby a shaking motion to the plant while between and in contact with the plates D, or while passing through the tunnel X, whereby the ripe bolls will be opened and the cotton disconnected from and shaken out of the cotton-bolls, and allowed to fall upon the bottom plates D.

The cotton thus shaken off will be carried aft by the branches of the plants resting upon the plates D, as well as by the natural current of air through the tunnel X, until met by the strong blast of air coming from the pipe T, which will blow all the loose cotton thus shaken off against the perforated plate or wire-cloth W, and upon the endless band U, by which latter the cotton is carried up the elevator in the manner above described, and discharged into the receiving-box Q.

Against the surface of the perforated plate or wire-cloth W a scraper or brush may be arranged, to brush the cotton blown against the same upon the endless band U.

The lever F may be provided with a suitable spring for the purpose of increasing thereby the force of the blows upon the end of the arm E, and consequently against the cotton-plant, and this spring may be connected with said lever F in such a manner as to be capable of being moved nearer to or further from its center of motion, whereby the force of the blow may be regulated.

The inner edges of the plates D may be provided with a suitable elastic and flexible material acted upon by small springs to keep the space between the plates made by the thickness of the stem of the cotton-plant before and behind said plant closed up, to prevent any falling out of the shaken-off cotton.

What I claim as my invention, and desire to secure by Letters Patent, is—

1. The arrangement of the bent arms or levers B B', hinged and turning on their center *a*, supporting on their lower ends plates D D, and connected by a suitable flexible material C, forming a long close tunnel X, in the manner and for the purpose substantially as described.

2. The arm E attached to or forming a part of the lever B, operated by a weighted lever or hammer, in the manner and for the purpose specified.

3. The weighted lever or hammer F, operated by projections or arms H, or their equivalent, and operating the arms which support the tube or tunnel X, in the manner and for the purpose essentially as set forth.

4. In a machine for picking cotton, the arrangement of a close tube or tunnel X, capable of separating or opening at the bottom to allow the cotton-plant to enter and pass through said tunnel, constructed in the manner and for the purpose substantially as hereinbefore described.

5. The bottom-plates D attached to the lower ends of the levers B and B', substantially in the manner and for the purpose described and set forth.

6. The arrangement of a tunnel X, arranged and constructed in the manner and for the purpose as above described, one or more air-pipes T, provided with an elongated opening V on the inner side, and situated on one side behind the end of the said tunnel, essentially in the manner and for the purpose described.

7. In combination with the tunnel X and air-pipe T, the perforated plate W or its equivalent, forming a continuation of said tunnel X at the opposite side of the air-pipe T, substantially in the manner and for the purpose set forth.

ROBERT F. COOKE.

Witnesses:
  HENRY E. ROEDER,
  LOUIS STUMM.